United States Patent
Richter et al.

(10) Patent No.: US 12,139,589 B2
(45) Date of Patent: Nov. 12, 2024

(54) PMMA-BASED CAST POLYMERS HAVING IMPROVED MECHANICAL PROPERTIES

(71) Applicant: Evonik Operations GmbH, Essen (DE)

(72) Inventors: Thomas Richter, Darmstadt (DE); Christoph Seipel, Babenhausen (DE); Kay Bernhard, Darmstadt (DE)

(73) Assignee: Evonik Operations GmbH, Essen (DE)

(*) Notice: Subject to any disclaimer, the term of this patent is extended or adjusted under 35 U.S.C. 154(b) by 80 days.

(21) Appl. No.: 17/632,983

(22) PCT Filed: Jul. 3, 2020

(86) PCT No.: PCT/EP2020/068757
§ 371 (c)(1),
(2) Date: Feb. 4, 2022

(87) PCT Pub. No.: WO2021/023444
PCT Pub. Date: Feb. 11, 2021

(65) Prior Publication Data
US 2022/0275160 A1  Sep. 1, 2022

(30) Foreign Application Priority Data
Aug. 8, 2019 (EP) .................................. 19190732

(51) Int. Cl.
C08J 9/06 (2006.01)
C08J 9/00 (2006.01)
C08J 9/02 (2006.01)
C08J 9/10 (2006.01)
C08K 13/02 (2006.01)

(52) U.S. Cl.
CPC .............. *C08J 9/02* (2013.01); *C08J 9/008* (2013.01); *C08J 9/06* (2013.01); *C08J 9/10* (2013.01); *C08K 13/02* (2013.01); C08J 2203/04 (2013.01); C08J 2333/12 (2013.01)

(58) Field of Classification Search
CPC ....... C08J 9/02; C08J 9/008; C08J 9/10; C08J 2203/04; C08J 2333/12; C08K 13/02
See application file for complete search history.

(56) References Cited

U.S. PATENT DOCUMENTS

| | | | |
|---|---|---|---|
| 4,530,806 A | 7/1985 | Melchior | |
| 4,816,492 A | 3/1989 | Schiller et al. | |
| 10,584,225 B2 | 3/2020 | Ritcher et al. | |
| 10,954,319 B2 | 3/2021 | Ritcher et al. | |
| 11,155,662 B2 | 10/2021 | Ritcher et al. | |
| 2018/0066078 A1 | 3/2018 | Ritcher et al. | |
| 2018/0079882 A1* | 3/2018 | Richter | C08K 5/0083 |
| 2019/0021114 A1 | 1/2019 | Barber | |
| 2019/0211124 A1* | 7/2019 | Richter | C08J 9/02 |

FOREIGN PATENT DOCUMENTS

| | | | |
|---|---|---|---|
| EP | 0068439 | 1/1983 | |
| JP | S55139433 | 10/1980 | |
| JP | 2002003635 | 1/2002 | |
| JP | 2006045256 | 2/2006 | |
| JP | 2013203954 | 10/2013 | |
| RU | 2591936 C1 | 7/2016 | |
| WO | WO-2018046380 A1 * | 3/2018 | C08F 2/02 |
| WO | 2021/023432 | 2/2021 | |

OTHER PUBLICATIONS

Extended European Search Report issued Dec. 20, 2019 in European Patent Application No. 19190732.8, 8 pages.
International Search Report issued Sep. 23, 2020 in PCT/EP2020/068757, 5 pages.
Written Opinion issued Sep. 23, 2020 in PCT/EP2020/068757, 9 pages.
U.S. Appl. No. 17/310,059, filed Jul. 14, 2021, Ritcher et al.
U.S. Appl. No. 17/423,152, filed Jul. 15, 2021, Ritcher et al.

* cited by examiner

*Primary Examiner* — Randy P Gulakowski
*Assistant Examiner* — Christina H. W. Rosebach
(74) *Attorney, Agent, or Firm* — Grüneberg and Myers PLLC

(57) ABSTRACT

A composition can be used for producing a PMMA-based cast polymer with a low styrene content using urea (derivatives) as a formulation constituent, and a hydrophilic inorganic compound as a filler. It is possible to produce PMMA-based cast polymers and mouldings having surprisingly high mechanical stability from the composition.

16 Claims, No Drawings

PMMA-BASED CAST POLYMERS HAVING IMPROVED MECHANICAL PROPERTIES

CROSS-REFERENCE TO RELATED APPLICATIONS

This application is the National Stage entry under § 371 of International Application No. PCT/EP2020/068757, filed on Jul. 3, 2020, and which claims the benefit of priority to European Application No. 19190732.8, filed on Aug. 8, 2019. The content of each of these applications is hereby incorporated by reference in its entirety.

BACKGROUND OF THE INVENTION

Field of the Invention

The invention relates to a composition for producing a PMMA-based cast polymer with a low styrene content using urea (derivatives) as a formulation constituent, and a hydrophilic inorganic compound as a filler. It is possible to produce PMMA-based cast polymers and mouldings having surprisingly high mechanical stability from the composition according to the invention.

Description of Related Art

Poly(methylmethacrylate) (PMMA) foams are extensively described in the literature but have hitherto achieved little if any industrial significance. One reason therefor is the frequently described, but very complicated production via autoclave processes in which PMMA is loaded with gaseous blowing agents, e.g. $CO_2$ or $N_2$, under high pressures in an autoclave and then expanded by release of pressure.

PMMA plastics may be produced by various processes. One of these processes is chamber polymerization, also known as cast polymerization. This comprises thermal or photochemical polymerization of a pourable monomer solution between two glass plates separated from one another by a sealing rope. This monomer solution contains at least the monomer (MMA) and a polymerization initiator. Once polymerization is complete, the glass plates are removed from the resulting polymer and a polymer sheet is obtained.

These cast polymers made of PMMA have an elastic modulus of about 3000 to 3300 MPa.

Cast polymerization also allows for the use of comonomers and additives. Employable here are in principle all comonomers soluble in the respective monomer solution and copolymerizable with MMA.

The mechanical properties of the thus obtained PMMA-based polymers may be adjusted within certain narrow limits through the choice of the comonomers. However, it is not known that for example the elastic modulus can be increased beyond a value of for example 4000 MPa in this way.

Polymethyl methacrylimide (PMMI) is a polymer which is based on PMMA and has an elastic modulus of about 4000 MPa (e.g. Pleximid® TT70 manufactured by Rohm GmbH). However, this polymer cannot be produced by a cast polymerization.

U.S. Pat. No. 4,816,492 describes the production of (meth)acrylate-based foams, wherein the monomer mixture is polymerized in the presence of blowing agents. The used blowing agents are halogenated hydrocarbons. Halogenated hydrocarbons, however, are problematic in that they have a severely adverse effect on the ozone layer and therefore are subject to significant environmental restrictions. Furthermore, the described foams produced exclusively from (meth)acrylates, vinyl acetate and chlorine-containing monomers do not have sufficient compressive strength.

EP 0 068 439 discloses the production of PMMA-based foams by polymerization of MMA in the presence of a blowing agent and subsequent foaming. 5 wt % to 40 wt % of the plasticizing agents, such as alkyl methacrylates having at least three least carbon atoms in the alkyl group, are employed to obtain foams. The use of hydrocarbons and/or hydrofluorocarbons as blowing agents is reported.

JP 2006045256 discloses using of a monomer mixture comprising 50% to 70% by weight of MMA, 14% to 30% by weight of (meth)acrylic acid, 10% to 20% by weight of styrene, and urea as a foaming agent to produce thermoplastic acrylic foams.

Likewise, describes JP 2002003635 using of a monomer mixture comprising 50% to 75% by weight of MMA, 14% to 27% by weight of (meth)acrylic acid, 10% to 20% by weight of styrene, and urea or urea derivatives as a foaming agent to produce thermoplastic acrylic foams.

JP 2013203954 discloses a method for producing an acrylic resin foam comprising the steps of (a) preparing a polymerizable solution containing a polymerizable monomer including maleic anhydride and methacrylamide, a foaming agent including urea, and a polymerization initiator; (b) polymerizing the polymerizable monomer mixture; and then (c) foaming the foamable polymer obtained in step (b). The foaming agent further includes an alcohol having a boiling point of 70° C. to 180° C. Specifically, it is suggested to use the polymerizable monomer mixture comprising 35% to 60% by weight of MMA, 14% to 35% by weight of (meth)acrylic acid, 10% to 20% by weight of styrene and 1% to 10% by weight of maleic anhydride and methacrylamide.

Patent applications JP 2006045256, JP 2002003635 and JP 2013203954 all describe at least 10% by weight content of styrene in the polymerizable compositions. Styrene is regarded as a "reasonably anticipated to be a human carcinogen". Therefore, if possible, the amount of styrene monomer used in polymer compositions is reduced to minimum.

It was found that if styrene is used as one of the essential components of the monomer mixture, the solubility of urea or a urea derivative, which is used as a foaming agent, is greatly reduced.

Moreover, the polymerization rate is also reduced. Furthermore, styrene causes the deterioration in weather resistance of the obtained foam.

JP 55139433 describes a method for producing an acrylic foam containing 50% to 96% by weight of MMA, 4% to 35% by weight of acrylic and/or methacrylic acid as comonomers, urea foaming agent and 0.05% to 4% by weight of water. The preferable amount of styrene monomer in the monomer mixture is less than 5% by weight. This patent application does not mention or suggest any means for additional increasing the mechanical strength of the acrylic foam or the cast polymer for producing thereof.

For all PMMA-based foams disclosed in the prior art, it is common that they have a compressive strength which is too low for use in composite materials, such as particularly, sandwich constructions. For uses as core material in sandwich composites, the mechanical properties, especially the compressive strength, are of great importance since they have an influence on the manufacturing processes of the sandwich elements and on the mechanical properties of the sandwich elements.

SUMMARY OF THE INVENTION

Problem

The problem addressed by the present invention was that of providing a novel process for producing PMMA-based foams which does not exhibit the discussed disadvantages of the prior art. Particularly, the produced PMMA-based foamed material should be very resistant to mechanical stress. The foam should especially have a very high compressive strength. Additionally, such PMMA-based foams should have a low density, preferably between 30 kg/m$^3$ and 350 kg/m$^3$.

A further problem addressed by the present invention was that of providing a PMMA-based cast polymer which is readily foamable, while allowing high degrees of freedom with regard to the establishment of cell size, cell distribution and foam density. Such unfoamed cast polymers should show exceptional mechanical properties. Particularly, the PMMA-based cast polymer should have an elastic modulus of at least 4500 MPa measured at room temperature.

Further problems addressed by the present invention were those of providing a suitable PMMA-based polymer which, as a foam, may be readily and simply joined to a second material, e.g. in the form of an outer layer, by means of adhesive bonding, melting or by resin curing on the surface. It is also important to this end that the obtained PMMA foams are compatible with the resin systems or adhesives used for producing the sandwich elements.

Solution

The above-mentioned technical problems are solved by a novel composition which is usable for producing PMMA-based cast polymers and optionally PMMA-based foams thereof.

In the course of a thorough experimentation, among other things, it was surprisingly found that the presence of hydrophilic inorganic compounds not soluble in the monomer mixture allows to substantially increase the mechanical strength of the PMMA-based cast polymer. To achieve a good compatibility of such hydrophilic inorganic compounds with the polymer matrix, and sufficient distribution of such compounds, it was necessary to reduce the amount of styrene or its derivatives to less than 4% by weight.

The object of the present invention is a composition for producing a PMMA-based cast polymer, characterized in that the composition contains 1% to 10% by weight of urea and/or urea derivatives, 0.001% to 2.0% by weight of an initiator, 0% to 20% by weight of a further non-polymerizable blowing agent, 0% to 5% by weight of a chain-transfer agent, 0.5% to 10% by weight of a hydrophilic inorganic compound essentially not soluble in the composition, and 53% to 98.498% by weight of a monomer mixture consisting of 60% to 95% by weight of MMA, 5% to 40% by weight of acrylic, methacrylic and/or itaconic acid, less than 4% by weight of styrene, α-methylstyrene and/or chlorostyrene, and 0% to 35% by weight of further MMA-copolymerizable monomers other than urea derivatives, wherein the inorganic hydrophilic compound has a methanol wettability of less than 30% by volume of methanol in a methanol/water mixture.

DETAILED DESCRIPTION OF THE INVENTION

The term "methanol wettability" means in the context of the present invention that for the determination of the methanol wettability, described in EP 2515829 B1, in each case 0.2 g (±0.005 g) of hydrophobic or hydrophobized particles are weighed into transparent centrifuge tubes. 8.0 ml portions of a methanol/water mixture with 10, 20, 30, 40, 50, 60, 70 or 80 vol. % methanol are added to each sample. The tubes are shaken for 30 seconds and then centrifuged at 2500 min$^{-1}$ for 5 minutes. The methanol wettability is the defined as the volume percent of methanol for which the sediment volume is 100%. The higher the number the higher the hydrophobicity.

An essential constituent of the inventive composition is a hydrophilic inorganic compound essentially not soluble in the composition. The hydrophilic inorganic compound is chosen from the group consisting of silica, metal oxides, metal hydroxides, metal silicates, talcum, and the mixtures thereof. The hydrophilic inorganic compound has an average diameter d$_{50}$ of between 5 and 1000 nm.

The particle size d$_{50}$ is determined according to ASTM 690-1992.

The term "inorganic compound" means in the context of the present invention that maximally one carbon atom is present in each molecule of the compound. Thus, SiC is an inorganic compound in the context of the present invention, whereas Na$_2$C$_2$O$_4$ is not.

The term "essentially not soluble" means in the context of the present invention that at least 90%, preferably at least 95%, more preferably at least 99% of the full amount of such a hydrophilic inorganic compound employed in the composition remains in the particulate state, not dissolved in the composition after at least 1 h of presence therein. The inorganic compounds, which react with one or more of the components of the inventive composition are not "essentially not soluble". Thus, lithium oxide would react with (meth)acrylic or itaconic acid present and is therefore not "essentially not soluble". The use of urea and/or urea derivatives as a constituent of the composition is an essential part of the invention, which, in combination with other features, brings about a marked improvement in the mechanical properties of the thus obtained cast polymers and the foams produced therefrom.

The urea derivatives present in the composition as an alternative to urea in accordance with the invention are preferably an N-alkylurea, for example N-methylurea, or N,N'-dialkylurea, such as N,N'-dimethylurea, unsubstituted or substituted 2-imidazolidones, such as 2-imidazolidone or N,N-dimethyl 2-imidazolidone, optionally further substituted 1-methyl-2-imidazolidinones and further cyclic urea derivatives.

In a further embodiment, the urea derivatives are at least partly copolymerizable with MMA urea derivatives, in particular N-(2-methacryloyloxyethyl)ethyleneurea. Hereinafter, in order to avoid ambiguity in terms of the overall composition, such copolymerizable with MMA urea derivatives are not considered as being a part of the monomer mixture.

The composition for producing a PMMA-based cast polymer consists of 1% to 10% by weight, preferably 2% to 8% by weight, particularly preferably 3% to 7% by weight of urea and/or urea derivatives, 0.001 to 2.0% by weight, preferably 0.002 to 1.0% by weight, particularly preferably 0.003% to 0.5% by weight of one or more initiators, 0% to 20% by weight of a further non-polymerizable blowing agent, 0% to 5% by weight of a chain-transfer agent, 0.5% to 10% by weight, preferably 1% to 8% by weight, particularly preferably 2% to 6% by weight of a hydrophilic inorganic compound and 53% to 98.498% by weight, preferably 57% to 96.999% by weight, more preferably 64.5% to 95.997% by weight of a monomer mixture.

The above-mentioned monomer mixture in turn consists of 60% to 95% by weight, preferably 70% to 90% by weight, particularly preferably 75% to 85% by weight, of MMA, 5% to 40% by weight, preferably 10% to 30% by weight, particularly preferably 15% to 25% by weight, of acrylic, methacrylic and/or itaconic acid, less than 4% by weight, preferably less than 2% by weight, particularly preferably less than 1% by weight of styrene, α-methylstyrene and/or chlorostyrene and 0% to 35% by weight, preferably 0% to 20% by weight, particularly preferably 0% to 10% by weight, very particularly preferably at least 0.1% by weight, of further MMA-copolymerizable monomers other than urea derivatives.

Particularly preferably, the composition according to the invention contains 2% to 8% by weight of urea and/or urea derivatives, 0.002% to 2.0% by weight of an initiator, 0% to 20% by weight of a further non-polymerizable blowing agent, 0% to 5% by weight of a chain-transfer agent, 1% to 8% by weight of a hydrophilic inorganic compound, and 57% to 96.998% by weight of a monomer mixture consisting of 70% to 90% by weight of MMA, 10% to 30% by weight of acrylic, methacrylic and/or itaconic acid, less than 4% by weight of styrene, α-methylstyrene and/or chlorostyrene, and 0% to 35% by weight of further MMA-copolymerizable monomers other than urea derivatives.

Particularly preferably, the monomer mixture contains essentially no styrene, α-methylstyrene and/or chlorostyrene, i.e. the amount of styrene, α-methylstyrene and/or chlorostyrene is less than 0.1% by weight, even more preferably less than 0.01% by weight of the monomer mixture.

While PMMA-based foams containing styrene and optionally maleic acid derivatives have proven mechanically very stable, the styrene proportion has been found to lead to incompatibility of the foams with certain resins. The foam produced from the composition according to the invention is therefore preferably free from styrene and maleic acid derivatives.

The optional further MMA-copolymerizable monomers in the monomer mixture may be crosslinkers. Such crosslinkers may be in particular ethylene glycol dimethacrylate, triallyl cyanurate, triallyl isocyanurate and/or allyl methacrylate. Further alternatives are di-, tri- or tetra(meth)acrylates. Any crosslinkers present may also be a mixture containing at least two of these crosslinkers. However, a high degree of covalent crosslinking is preferably not desired.

The monomer mixture present in the composition of the present invention preferably contains at least 0.1% by weight of the further MMA-copolymerizable monomers and, which are crosslinkers, in particular ethylene glycol dimethacrylate, triallyl cyanurate, triallyl isocyanurate, allyl methacrylate, or a mixture thereof.

Further optional MMA-copolymerizable monomers may be alkyl acrylates. These alkyl acrylates are preferably alkyl acrylates having 1 to 8 carbon atoms in the alkyl radical, particularly preferably ethyl acrylate, n-propyl acrylate or n-butyl acrylate. The acrylates as repeating units in the polymer especially increase the thermal stability of said polymer.

Monomers optionally present in addition to MMA, may also or in addition include alkyl methacrylates other than MMA. Such alkyl methacrylates are in particular those having 2 to 8 carbon atoms in the alkyl radical. Particular preference is given to ethyl methacrylate, n-propyl methacrylate, n-butyl methacrylate or 2-ethylhexyl methacrylate.

Further advantageously employable monomers of this category are in particular hydroxyl-functional alkyl (meth)acrylates. These are preferably 2-hydroxyethyl (meth)acrylate or 3-hydroxypropyl (meth)acrylate.

The monomer mixture preferably contains between 5% and 10% by weight of tert-butyl methacrylate, isopropyl methacrylate, tert-butyl acrylate and/or isopropyl acrylate.

The monomer mixture may optionally contain N-alkyl (meth)acrylamides having 1 to 12 carbon atoms in the alkyl group and no methacrylamide or N,N-dialkylmethacrylamides as MMA-copolymerizable monomers. The N-alkyl (meth)acrylamide is particularly preferably N-methylolmethacrylamide, 2-hydroxypropylmethacrylamide or N-isopropylmethacrylamide, especially preferably N-isopropylmethacrylamide.

Such N-alkyl(meth)acrylamides entail great advantages in terms of later joining with for example outer layers to afford sandwich components or other composite materials and an altogether better further processability in terms of adhesive bonding, welding or superficial resin curing. This is particularly the case when the present foams contain neither styrene nor maleic acid derivatives.

The chain-transfer agent which is optionally present in the inventive composition, is preferably a compound having from one to five mercaptan groups, a γ-terpinene or a mixture of at least two of these chain-transfer agents. The chain-transfer agent is particularly preferably pentaerythritol tetrathioglycolate, 2-mercaptoethanol, an alkyl mercaptan having from 2 to 12 carbon atoms, thioglycolic acid, a thioglycolate, γ-terpinene or a mixture of at least two of these chain-transfer agents.

Especially suitable non-copolymerizable blowing agents other than urea or urea derivatives are preferably n-heptane, MTBE, methyl ethyl ketone, an alcohol having one to four carbon atoms, such as tert-butanol, water, methylal, and/or tert-butyl methyl ether.

The composition can also contain further components. Examples of these further components include release agents, waxes, pigments, stabilizers, in particular UV stabilizers, and/or adhesion promoters.

Further object of the invention is a PMMA-based cast polymer, obtainable by polymerization of the composition according to the invention.

Another object of the invention is a process for producing a PMMA-based cast polymer, wherein the composition according to the invention, as described hereinabove, is polymerized at a temperature between 20° C. and 100° C.

Optionally, the entirety of the composition or a part of the composition may be in the form of polymer and/or oligomer to an extent of up to 80% by weight at the beginning of the polymerization. This is what is known as a "syrup process" and is described further hereinbelow.

When oligomers or polymers are used, the polymerization is a so-called syrup polymerization which has proven useful in particular in a casting process between two plates. At the end of such a syrup polymerization, two PMMA types having different compositions may be present simultaneously as a mixture in the cast polymer or in the moulding or foam produced therefrom without any relevant influence on foaming.

The polymerization process, preferably in the form of a bulk polymerization, is carried out at a temperature between 20° C. and 100° C., preferably between 30° C. and 70° C.

Further object of the invention is a PMMA-based foam, obtainable by foaming of the cast polymer of the invention or by foaming of the at least partly polymerized composition according to the invention.

The PMMA-based foam preferably has a density between 30 kg/m³ and 350 kg/m³, particularly preferably between 50 and 300 kg/m³ determined according to DIN EN ISO 1183 (Publication: 2013-04).

Another object of the invention is a process for producing a PMMA-based foam according to the invention, wherein the composition of the invention is polymerized at a temperature between 20° C. and 100° C. and is subsequently foamed at a temperature between 130° C. and 250° C.

Foaming is preferably carried out—depending on the blowing agents used—at a temperature between 130° C. and 250° C., more preferably between 150° C. and 230° C.

The polymerization and/or foaming are preferably carried out in stages at different temperatures. It is possible, alternatively or in addition, to carry out the polymerization and the foaming at least partly simultaneously.

In such a simultaneous mode of operation, the process may optionally be performed in particular such that the polymerization is performed only incompletely, in this case preferably to a conversion of at least 80%, and the final end-polymerization is carried out during foaming. Such a process has the advantage that at the beginning of the foaming procedure, the remaining monomers have a plasticizing effect without any plasticizing compound remaining in the finished foam. In such an embodiment, the polymerization and the foaming would thus be carried out partly simultaneously at one foaming temperature.

The polymerization is preferably carried out in a shape-conferring vessel, in particular in the form of a chamber polymerization between two plates, for example glass plates. In the simplest case a rectangular tub may be concerned for example. Polymerization in such a tub later affords a sheet whose thickness has been determined by the fill level in the tank/the plate spacing. However, more complex shapes are also conceivable for the vessel. The polymerization is preferably carried out at a temperature between 30° C. and 70° C. Employable initiators include not only well-known free-radical initiators, for example peroxides or azo initiators, but also redox systems or UV initiators.

Polymerization temperatures below 40° C. apply particularly to these redox systems and UV initiators. UV initiators are initiated by irradiation with appropriate UV light, while redox initiators comprise two-component systems initiated by mixing the two components and the monomers.

Foaming may subsequently take place in the same vessel, in which case the volume increase is restricted to one direction, the open side of the vessel. However, the polymerized material can also be foamed without enclosure or in a suspended manner. Foaming is preferably carried out in an oven. As an alternative, it is also possible to bring about foaming by irradiation with IR radiation, in particular radiation having a wavelength in the range from 0.78 to 2.20 µm, preferably from 1.20 to 1.40 µm. Microwave foaming represents a further alternative. The combination of different methods, such as IR radiation, microwaves and/or heating in an oven, is also conceivable.

Foaming as well as the polymerization may each be carried out in a plurality of temperature stages as previously mentioned. The temperature may be raised later in the polymerization to additionally enhance the conversion and thereby reduce the residual monomer content. During foaming, the foaming temperature can be increased in stages in order to influence the cell distribution, the cell size and the number of cells.

It has surprisingly been found that using the composition according to the invention, it is possible to obtain a PMMA-based polymer having an elastic modulus measured at room temperature of more than 4500 MPa. By comparison a pure PMMA cast polymer has an elastic modulus in the range between 2800 and 3300 MPa.

The PMMA-based foams produced according to the invention have a surprisingly high strength coupled with a surprisingly low brittleness and may therefore find application in lightweight construction for example. Furthermore, owing to the good material properties, there is no need for the use of plasticizers, e.g. relatively long-chain alkyl (meth) acrylates or phthalates, which according to knowledge to date have a positive effect on the flowability or the foamability but at the same time have an adverse effect on the mechanical properties of the PMMA foam, in particular the strength.

It has been found that for the same cell structure as described in the prior art, a foam produced from a polymer having an elastic modulus X exhibits better mechanical properties than a foam produced from a polymer having an elastic modulus Y when X>Y. Therefore, the high elastic modulus of the polymer is a prerequisite for obtaining good mechanical properties of the foam.

The PMMA-based cast polymers produced according to the invention may be used in a variety of different applications. Examples of such uses include filled or transparent mouldings, glazing, in advertising materials, for production of films, in architectural building elements, as diffusers in lighting applications, in furniture construction, in boatbuilding, in vehicle construction, in the aerospace industry or in model building. It is especially preferable when said polymers are used for producing likewise inventive PMMA foams.

The PMMA-based foams produced according to the invention may also find a very wide variety of uses. Examples of such uses are weathering-resistant insulation materials, core material for sandwich composites, in blades of wind power plants, in boat- and shipbuilding and also in subsea applications, in lightweight construction, as packaging material, as energy absorbers in crash elements, in architectural building elements, as diffusers in lighting applications, in furniture construction, in vehicle construction, in the aerospace industry or in model building.

Examples

The PMMA polymers were produced in the casting process. To this end, glass chambers consisting of 2 glass plates (400×300 mm) held apart and sealed by a sealing tape (13 mm thickness) were filled with the monomer solution.

To produce the monomer solution, the ingredients were added together according to the formulations recited below (Tables 1-4) and stirred until all constituents were dissolved.

The thus produced and filled glass chambers were stored in a water bath at 40° C. for the polymerization. After about 27 h the glass chambers were end-polymerized at 115° C. The glass plates and the sealing rope were then removed. A hard and translucent polymer was obtained in all cases.

AEROSIL® OX50 (manufacturer: Evonik Resource Efficiency GmbH) was used as a hydrophilic inorganic compound.

Tensile tests for determining the elastic modulus of the polymers were performed using a Zwick/Roell Z030 instrument. Measurements were carried out at standard conditions of 23° C. and 50% humidity. The samples were stored for at least 16 hours at identical conditions (23° C.-50% humidity) prior to measurement. The results are shown in Table 5.

TABLE 1

Example 1

| Example 1 | wt % |
|---|---|
| Methyl methacrylate | 69.45 |
| Methacrylic acid | 20.00 |
| Butyl acrylate | 1.00 |
| Urea | 5.00 |
| Silica (AEROSIL ® OX50) | 4.00 |
| 2,2'-Azobis(2,4-dimethylvaleronitrile) | 0.05 |
| 2-Ethylhexyl thioglycolate | 0.50 |

TABLE 2

Comparative Example 1

| Comparative Example 1 | wt % |
|---|---|
| Methyl methacrylate | 63.45 |
| Methacrylic acid | 20.00 |
| Butyl acrylate | 1.00 |
| Styrene | 6.00 |
| Urea | 5.00 |
| Silica (AEROSIL ® OX50) | 4.00 |
| 2,2'-Azobis(2,4-dimethylvaleronitrile) | 0.05 |
| 2-Ethylhexyl thioglycolate | 0.50 |

TABLE 3

Comparative Example 2

| Comparative Example 2 | wt % |
|---|---|
| Methyl methacrylate | 74.45 |
| Methacrylic acid | 20.00 |
| Butyl acrylate | 1.00 |
| Silica (AEROSIL ® OX50) | 4.00 |
| 2,2'-Azobis(2,4-dimethylvaleronitrile) | 0.05 |
| 2-Ethylhexyl thioglycolate | 0.50 |

TABLE 4

Comparative Example 3

| Comparative Example 3 | wt % |
|---|---|
| Methyl methacrylate | 74.45 |
| Methacrylic acid | 20.00 |
| Butyl acrylate | 1.00 |
| Urea | 4.00 |
| 2,2'-Azobis(2,4-dimethylvaleronitrile) | 0.05 |
| 2-Ethylhexyl thioglycolate | 0.50 |

TABLE 5

Elastic moduli

| Elastic modulus comparison | Elastic modulus (MPa) |
|---|---|
| Example 1 (with urea and SiO$_2$) | 4900 |
| Comparative example 1 (with urea, SiO$_2$ and styrene) | 4400 |
| Comparative example 2 (no urea, with SiO$_2$) | 3600 |
| Comparative example 3 (with urea, no SiO$_2$) | 4500 |

Table 5 shows the results of the measurement of the elastic moduli of the polymers prepared in Example 1 and comparative examples 1-3. The polymer prepared without the use of urea as a blowing agent and silica as a filler (comparative example 2), shows the lowest elastic modulus. The use of both urea and silica, but no styrene (example 1) shows the best results. The use of urea, silica and styrene leads to inferior results (comparative example 1) than in example 1, as well as the use of urea without silica (comparative example 3).

The invention claimed is:

1. A composition for producing a poly(methyl methacrylate)-based (PMMA-based) cast polymer, wherein the composition contains:
   1% to 10% by weight of urea and/or a urea derivative,
   0.001% to 2.0% by weight of an initiator,
   0% to 20% by weight of a further non-polymerizable blowing agent,
   0% to 5% by weight of a chain-transfer agent,
   0.5% to 10% by weight of a hydrophilic inorganic compound essentially not soluble in the composition, and
   53% to 98.498% by weight of a monomer mixture consisting of
     60% to 95% by weight of methyl methacrylate (MMA),
     5% to 40% by weight of acrylic acid, methacrylic acid, and/or itaconic acid,
     and 0% to 35% by weight of a further MMA-copolymerizable monomer other than urea derivatives,
   wherein the hydrophilic inorganic compound has a methanol wettability of less than 30% by volume of methanol in a methanol/water mixture,
   the monomer mixture contains essentially no styrene, α-methylstyrene, and/or chlorostyrene and excludes methacrylamide, N-alkyl(meth)acrylamides and N,N-dialkylmethacrylamides, and
   the hydrophilic inorganic compound is selected from the group consisting of silica, a metal oxide, a metal hydroxide, a metal silicate, talcum, and a mixture thereof,
   wherein a PMMA-based cast polymer produced from the composition has an elastic modulus of at least 4,500 MPa, measured at room temperature.

2. The composition according to claim 1, wherein the composition contains:
   2% to 8% by weight of the urea and/or the urea derivative,
   0.002% to 1.0% by weight of the initiator,
   0% to 20% by weight of the further non-polymerizable blowing agent,
   0% to 5% by weight of the chain-transfer agent,
   1% to 8% by weight of the hydrophilic inorganic compound, and
   57% to 96.999% by weight of the monomer mixture consisting of
     70% to 90% by weight of the MMA,
     10% to 30% by weight of the acrylic acid, the methacrylic acid, and/or the itaconic acid,
     and
     0% to 35% by weight of the further MMA copolymerizable monomer other than urea derivatives.

3. The composition according to claim 1, wherein the hydrophilic inorganic compound has an average diameter d50 of between 5 and 1000 nm, determined according to ASTM 690-1992.

4. The composition according to claim 1, wherein the monomer mixture contains at least 0.01% by weight of the further MMA-copolymerizable monomer, and wherein the further MMA-copolymerizable monomer is a crosslinker.

5. The composition according to claim 1, wherein the urea derivative is selected from the group consisting of an N-alkylurea, an N,N'-dialkylurea, a 2-imidazolidone, a 1-methyl-2-imidazolidinone, and a mixture thereof.

6. The composition according to claim 1, wherein the urea derivative is at least partly copolymerizable with MMA urea derivatives.

7. The composition according to claim 1, wherein the monomer mixture contains between 5% and 10% by weight of tert-butyl methacrylate, isopropyl methacrylate, tert-butyl acrylate, and/or isopropyl acrylate.

8. A PMMA-based cast polymer, obtainable by polymerization of the composition according to claim 1.

9. A process for producing a PMMA-based cast polymer, the process comprising:
polymerizing the composition according to claim 1 at a temperature between 20° C. and 100° C.

10. A PMMA-based foam, obtainable by foaming the PMMA-based cast polymer according to claim 8.

11. The PMMA-based foam according to claim 10, wherein the PMMA-based foam has a density of between 30 kg/m³ and 350 kg/m³, determined according to DIN EN ISO 1183.

12. A process for producing a PMMA-based foam, the process comprising:
polymerizing the composition according to claim 1 at a temperature between 20° C. and 100° C., and subsequently foaming at a temperature between 130° C. and 250° C.

13. The process according to claim 12, wherein the polymerizing and foaming are carried out at least partly simultaneously.

14. The composition according to claim 4, wherein the further MMA-copolymerizable monomer is ethylene glycol dimethacrylate, triallyl cyanurate, triallyl isocyanurate, allyl methacrylate, or a mixture thereof.

15. The composition according to claim 6, wherein the urea derivative is at least partly copolymerizable with N-(2-methacryloyloxyethyl)ethyleneurea.

16. A PMMA-based foam, obtainable by foaming the composition according to claim 1, which is at least partly polymerized.

* * * * *